Patented Jan. 18, 1938

2,105,746

UNITED STATES PATENT OFFICE 2,105,746

PLAYING BALL

Alexander D. Macdonald, Malden, Mass., assignor to B. B. Chemical Co., Boston, Mass., a corporation of Massachusetts No Drawing. Application September 5, 1934
Serial No. 742,872

3 Claims. (Cl. 154—17)

This invention relates to the securing together of parts, particularly of playing balls, and is illustrated herein with respect to the adhesive attachment of golf ball covers to wound cores.

In the manufacture of golf balls it is customary to wind rubber threads under tension on a rubber or other center to form a core. A cover usually consisting primarily of balata is then molded on the core.

For the best playing and lasting qualities the cover should be securely attached to the core throughout the area of contact. Ordinarily this is accomplished so far as possible by winding the core by means of the so-called "basket weave" mode of winding which provides interstices or pockets of appreciable size on the surface of the core. Then, during the molding operation, when the thermoplastic balata cover has been softened by heat, the cover material enters these pockets or interstices and becomes more or less mechanically interlocked with the core.

The above process has been fairly satisfactory in obtaining the desired adhesion of cover to core but it has also been quite expensive because the basket type of winding is slow and only a relatively small number of balls can be wound on a machine per day. In contrast, the "great circle" mode of winding is very rapid and a large number of cores may be wound by a machine in the same time that a much smaller number of cores may be wound by the basket method. But the great circle mode of winding provides a core whose surface is relatively smooth and which does not have the pockets or interstices into which the balata cover will readily penetrate to secure an anchorage and thereby obtain adhesion of the cover and core throughout the area of contact.

In order to obtain a more perfect adhesion of the cover to the core in the case of both basket wound and great circle wound cores, various adhesives have been employed but without much success. Thus, the usual rubber cements, wherein rubber is dissolved in an organic solvent, have not been suitable because the solvent attacks the tension-wound rubber threads on the core and causes them to snap. Neither have aqueous dispersions of rubber, such as latex cements, been satisfactory for this purpose, for if, after application, latex cements are permitted to dry thoroughly, thus removing the water, the resulting adhesion has been quite imperfect. On the other hand, if the latex adhesive is not dried thoroughly, then the unremoved water produces steam during the molding operation, causing blow holes or other imperfections in the cover.

An object of the present invention is to provide an improved method of securing a cover to a core in the manufacture of golf balls.

In the accomplishment of the above and other objects I have discovered that a highly advantageous union of the cover to the rubber thread-wound core of a golf ball may be produced by applying to the core a solution of polymerized chloroprene in a solvent which will not appreciably attack the rubber threads. The solvent of the applied solution is then permitted to dissipate whereby a layer of polymerized chloroprene is deposited substantially uniformly over the surface portions of the core. The cover consisting usually primarily of balata is then molded on the core at a temperature in the neighborhood of 212° F. to 260° F.

Among the solvents which may be employed for the purpose of this invention are various members of a class which will dissolve polymerized chloroprene but which will not appreciably attack rubber, such class including propylene oxide, dioxan, furfurane and other cyclic ethers of the glycols. Such compositions per se are within the scope of the invention of my copending application, Serial No. 742,873, filed September 5, 1934.

By the practice of the above method there is provided a golf ball structure wherein the polymerized chloroprene has penetrated between the wound threads of the core sufficiently to obtain a firm anchorage thereto and to become mechanically interlocked with and adhesively secured to the tension-wound threads. At the same time the polymerized chloroprene is adhesively and integrally united with the material of the cover. The union thus obtained between the cover and core may extend entirely over the contiguous areas thereof.

The practice of the invention is illustrated in the following example:

A solution of polymerized chloroprene in propylene oxide is prepared containing 1 part by weight of polymer to 6 parts by weight of propylene oxide. A golf ball core is dipped into the above solution for a few seconds and after removal therefrom is permitted to dry in such a manner that a fairly uniform coating of polymerized chloroprene is deposited on the core. By reason of the fact that propylene oxide is not a solvent for rubber the tension-wound threads on the core remain unattacked by the solvent. After the core has been permitted to dry for a sufficient length of time to remove substantially all of the solvent, said core is ready for the application of a cover thereto. The cover is in the form of hollow hemispherical sections consisting in the case of present-day golf balls primarily of balata. The hemispherical cover portions are applied to the coated golf ball core and the assemblage is molded in a golf ball mold, the sections of which are disposed in a press between platens which are maintained at about 230–240° F. by means of steam for about two minutes, after which the mold is cooled to room temperature by circulating water through the platens.

In preparing compositions such as described above, there may be incorporated certain compounding materials. Thus, in percentages by weight based upon the amount of polymerized chloroprene, there may be associated 5% of wood rosin, 5% of zinc oxide, and 10% of magnesium oxide. Furthermore, in carrying out the invention, the cores may be tension-wound with rubber thread, and windings of the great circle type as well as of the basket weave type may be employed. The hollow hemispherical cover sections may be of any thermoplastic type, for example, the usual commercial type consisting primarily of balata and containing some rubber and rubber compounding ingredients. The heating of the golf ball mold may be carried out by means of steam or in any other suitable manner.

In the case of golf balls made as described above, the polymerized chloroprene is integrally united to the material of the cover and, furthermore, the polymer penetrates through several layers of the wound threads on the core and becomes securely anchored and adhesively attached thereto and mechanically interlocked therewith. In the resulting golf ball the cover and core are adhesively secured together throughout the area of contact.

The advantageous mode of adhesion contemplated by this invention may be obtained whether the cores are wound in the great circle, basket weave, or any other suitable type of winding.

It will be seen that this invention makes possible the more economical manufacture of high-grade golf balls by reason of the fact that there is made possible the extremely strong attachment of a cover to a core wound in the economical "great circle" manner.

It should be noted that this invention makes possible still further economies in golf ball manufacture in that not only may the rubber threads be wound on the core in any suitable manner and excellent adhesion obtained with the cover, but relatively wide ribbon-like rubber threads also may be employed with corresponding advantages in decreased winding time and hence greater production per winding machine.

A form of polymerized haloprene suitable for the purposes of this invention is the synthetic rubber-like material known commercially as "DuPrene", and which may be made by polymerizing chloroprene in the manner set forth in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins. So far as applicable to the purposes of this invention, other haloprenes are to be considered as equivalents of chloroprene, for example, bromoprene, described in said Patent No. 1,950,431. The polymerization of bromoprene is described in United States Letters Patent No. 1,950,433, granted March 13, 1934, upon an application of W. H. Carothers and A. M. Collins.

The term "balata" as used in the claims is intended to be construed sufficiently broadly to include equivalent materials.

Having described my invention, what I claim as new and desire to secure by Letters Patent of the United States is:

1. In the manufacture of golf balls, the method of securing a thermoplastic cover to a rubber thread-wound core which comprises applying to the core and substantially uniformly a solution of polymerized chloroprene in a solvent which will not appreciably attack the rubber threads during the period of contact therewith, causing the solvent to dissipate after the solution has been applied to the core, whereby a layer of polymerized chloroprene is deposited substantially uniformly over the surface portions of the core, assembling the cover and core, and molding the assemblage.

2. In the manufacture of golf balls, the method of securing a balata-containing cover to a rubber thread-wound core which comprises applying to the core and substantially uniformly a solution of polymerized chloroprene in a solvent selected from an arbitrary class comprising propylene oxide, dioxan, and furfurane, causing the solvent to dissipate after the solution has been applied to the core whereby a layer of polymerized chloroprene is deposited substantially uniformly over the surface portions of the core, assembling the cover and core, and molding the assemblage.

3. In the manufacture of golf balls, the method of securing a balata cover to a rubber thread-wound core which comprises applying to the core a solution of polymerized chloroprene in propylene oxide, permitting the coated core to dry after application of the solution thereto, whereby the deposited polymerized chloroprene becomes securely associated with the wound threads of the core, applying balata cover portions to the core, and placing the assembled core and cover portions under molding pressure at a temperature of about 212° to 260° F., whereby the polymerized chloroprene becomes adhesively united to the cover.

ALEXANDER D. MACDONALD.